US011113806B2

(12) United States Patent
Jana et al.

(10) Patent No.: US 11,113,806 B2
(45) Date of Patent: Sep. 7, 2021

(54) SYSTEMS AND METHODS FOR MENU DIRECTED INSPECTION

(71) Applicant: General Electric Company, Schenectady, NY (US)

(72) Inventors: Ritwick Jana, Bangalore (IN); Bryan David Maule, Skaneateles Falls, NY (US); Michael Christopher Domke, Skaneateles Falls, NY (US); Thomas D. Britton, Skaneateles Falls, NY (US); Robert Scott Lockhart, Skaneateles Falls, NY (US)

(73) Assignee: Baker Hughes, a GE Company, LLC, Houston, TX (US)

( * ) Notice: Subject to any disclaimer, the term of this patent is extended or adjusted under 35 U.S.C. 154(b) by 0 days.

(21) Appl. No.: 16/876,898

(22) Filed: May 18, 2020

(65) Prior Publication Data

US 2020/0279366 A1 Sep. 3, 2020

Related U.S. Application Data

(63) Continuation of application No. 14/292,840, filed on May 31, 2014, now abandoned.

(51) Int. Cl.
*G06T 7/37* (2017.01)
*G06F 9/451* (2018.01)
*G06T 7/00* (2017.01)
*G06T 7/33* (2017.01)

(52) U.S. Cl.
CPC ............ *G06T 7/0006* (2013.01); *G06F 9/451* (2018.02); *G06T 7/344* (2017.01); *G06T 7/37* (2017.01)

(58) Field of Classification Search
USPC .......................................................... 348/82
See application file for complete search history.

(56) References Cited

U.S. PATENT DOCUMENTS

2015/0293877 A1* 10/2015 Liang .................. G06F 13/4068
710/33

OTHER PUBLICATIONS

Working with files and folders http://windows.microsoft.com/en-us/windows/working-with-files-folders#1TC=windows-7 (Year: 2011).*

(Continued)

*Primary Examiner* — Mikhail Itskovich
(74) *Attorney, Agent, or Firm* — Mintz Levin Cohn Ferris Glovsky and Popeo, P.C.

(57) ABSTRACT

A non-destructive testing (NDT) system can provide a tree model of an inspection on a display of an NDT device and on a web page configured in a web browser on a computing device coupled to the NDT device. Inspection data acquired using the NDT device can be provided in real-time as the inspection data is associated with a node configured in the tree model. The NDT system can generate an inspection tree model based on an inspection template including a template tree model. Defect properties, inspection instructions, and/or image transforms can be applied to nodes of the template tree model such that the generated inspection tree model includes the applied defect properties, inspection instructions, and/or image transforms, which can then be applied to the inspection data acquired at the inspection point location corresponding to each node.

20 Claims, 12 Drawing Sheets

(56) References Cited

OTHER PUBLICATIONS

Creating Symbolic Links https://msdn.microsoft.com/en-us/library/windows/desktop/aa363878(v=vs.85).aspx (Year: 2011).*
ThinkPad® T61 and T61p (14.1-inch) Hardware Maintenance Manual (Year: 2011).*
Windows 7 Copy Progress Window.jpg (Year: 2011).*

* cited by examiner

MDI | INSPECTION DETAILS         5/16/2014  1:55 PM

SERIAL NUMBER*

DATE  5/16/2014

TIME  1:55 PM

✓ DONE

Figure 3

SYSTEMS AND METHODS FOR MENU DIRECTED INSPECTION

RELATED APPLICATION

This application is a continuation-in-part of, and claims priority to, U.S. patent Ser. No. 14/292,840, filed May 31, 2014, and entitled SYSTEMS AND METHODS FOR MENU DIRECTED INSPECTION, the entirety of which is incorporated herein by reference.

BACKGROUND

The subject matter disclosed herein relates to non-destructive inspection. Specifically, the subject matter described below relates to systems and methods for performing non-destructive testing via a Menu Directed Inspection (MDI).

Certain devices may be used to inspect a variety of systems and facilities, such as power generation equipment and facilities, oil and gas equipment and facilities, aircraft equipment and facilities, manufacturing equipment and facilities, and the like. The inspection equipment may include various non-destructive inspection or non-destructive testing (NDT) devices. For example, video borescopes, portable eddy current inspection devices, portable X-ray inspection devices, and the like, may be used to observe or otherwise inspect the system and facilities using non-destructive inspection techniques. The NDT devices and NDT computing systems may include graphical user interfaces useful in enabling users to create NDT inspections, perform inspection functions, and provide inspection data to computing devices coupled to NDT devices. It would be beneficial to improve the graphical user interfaces of the NDT devices and improve the overall efficiency of the NDT inspection.

SUMMARY

Certain embodiments commensurate in scope with the originally claimed invention are summarized below. These embodiments are not intended to limit the scope of the claimed invention, but rather these embodiments are intended only to provide a brief summary of possible forms of the invention. Indeed, the invention may encompass a variety of forms that may be similar to or different from the embodiments set forth below.

In one aspect, a method of performing non-destructive testing (NDT) is provided. In one embodiment, the method can include providing a tree model of an inspection of machinery on a display of an NDT device. The tree model can include a plurality of nodes and each node of the plurality of nodes can correspond to an inspection point of the inspection. The method can also include providing the tree model of the inspection in a web browser configured on a computing device communicatively coupled to the NDT device. The web browser can display a web page providing the tree model. The method can further include receiving a user input on the NDT device selecting a node included in the tree model. The method can also include acquiring inspection data of the machinery using the NDT device. The inspection data can be acquired at the inspection point corresponding to the selected node. The method can further include providing, using the NDT device, the inspection data in the web page with the tree model. The inspection data can be automatically provided in real-time within the web page as the inspection data is associated with the selected node.

In one aspect, a method of creating an inspection tree model of a non-destructive testing (NDT) inspection is provided. In one embodiment, the method can include providing an inspection template associated with an NDT inspection. The inspection template can include a template tree model can correspond to an inspection of machinery and can include a plurality of nodes. Each node of the plurality of nodes in the template tree model can correspond to an inspection point of the NDT inspection. The method can also include applying one or more defect properties to at least on node in the template tree model. Each of the applied defect properties can be selected from a plurality of defect properties characterizing defects of the machinery. The method can further include applying one or more inspection instructions to at least one node in the template tree model. Each of the applied inspection instructions can be selected from a plurality of inspection instructions characterizing inspection tasks to be performed during the NDT inspection of the machinery. The method can also include applying one or more image transforms to at least one node in the template tree model. Each of the applied image transforms can be selected from a plurality of image transforms characterizing image processing modifications to be applied to the image data acquired during the NDT inspection at the inspection point. The method can further include generating an inspection tree model based on the inspection template and including the defect properties, inspection instructions, and image transforms applied to at least one node in the template tree model. The method can also include providing the generated inspection tree model in a display of an NDT device during the NDT inspection.

Non-transitory computer program products (i.e., physically embodied computer program products) are also described that store instructions, which when executed by one or more data processors of one or more computing systems, causes at least one data processor to perform operations herein. Similarly, computer systems are also described that may include one or more data processors and memory coupled to the one or more data processors. The memory may temporarily or permanently store instructions that cause at least one processor to perform one or more of the operations described herein. In addition, methods can be implemented by one or more data processors either within a single computing system or distributed among two or more computing systems. Such computing systems can be connected and can exchange data and/or commands or other instructions or the like via one or more connections, including a connection over a network (e.g., the Internet, a wireless wide area network, a local area network, a wide area network, a wired network, or the like), via a direct connection between one or more of the multiple computing systems, etc.

BRIEF DESCRIPTION OF THE DRAWINGS

These and other features, aspects, and advantages of the present invention will become better understood when the following detailed description is read with reference to the accompanying drawings in which like characters represent like parts throughout the drawings, wherein:

FIG. 3 is a screenshot of an inspection details screen included in the GUI of the NDT device of FIG. 1, in accordance with an embodiment of the present approach;

DETAILED DESCRIPTION

One or more specific embodiments of the present invention will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, or industry or government agency mandated inspection requirements such as an airworthiness directive (AD) from the FAA, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present invention, the articles "a," "an," "the," and "said" are intended to mean that there are one or more of the elements. The terms "comprising," "including," and "having" are intended to be inclusive and mean that there may be additional elements other than the listed elements.

Present embodiments are generally directed towards systems for performing non-destructive inspections of industrial equipment, using, for example, a variety of portable non-destructive testing (NDT) devices described in more detail below. Specifically, the embodiments described herein relate to a graphical user interface (GUI) providing for a menu-driven inspection (MDI) technique. An MDI structure may model the inspection areas and points as an inspection point tree. An NDT device operator may then navigate through the inspection point tree to acquire images and videos of the specified inspection areas and points. By following the inspection point tree, the operator may quickly and efficiently inspect the equipment and obtain improved testing coverage of the equipment. Further, the MDI structure may automatically associate the acquired images and videos with the corresponding inspection areas and points, which may improve equipment and facilities inspection, for example, when compared to not using the MDI techniques disclosed herein. The MDI GUI may also allow the operator to flag an image or video if he or she suspects or observes a defect within a particular inspection point or area. The GUI may then present in tandem an icon that indicates if any images and videos for an inspection point or area are flagged. Additionally, the GUI may include an interactive marker that displays the current path traversed through the inspection point tree and may be used to navigate to different nodes of the inspection point tree.

Figure 1:
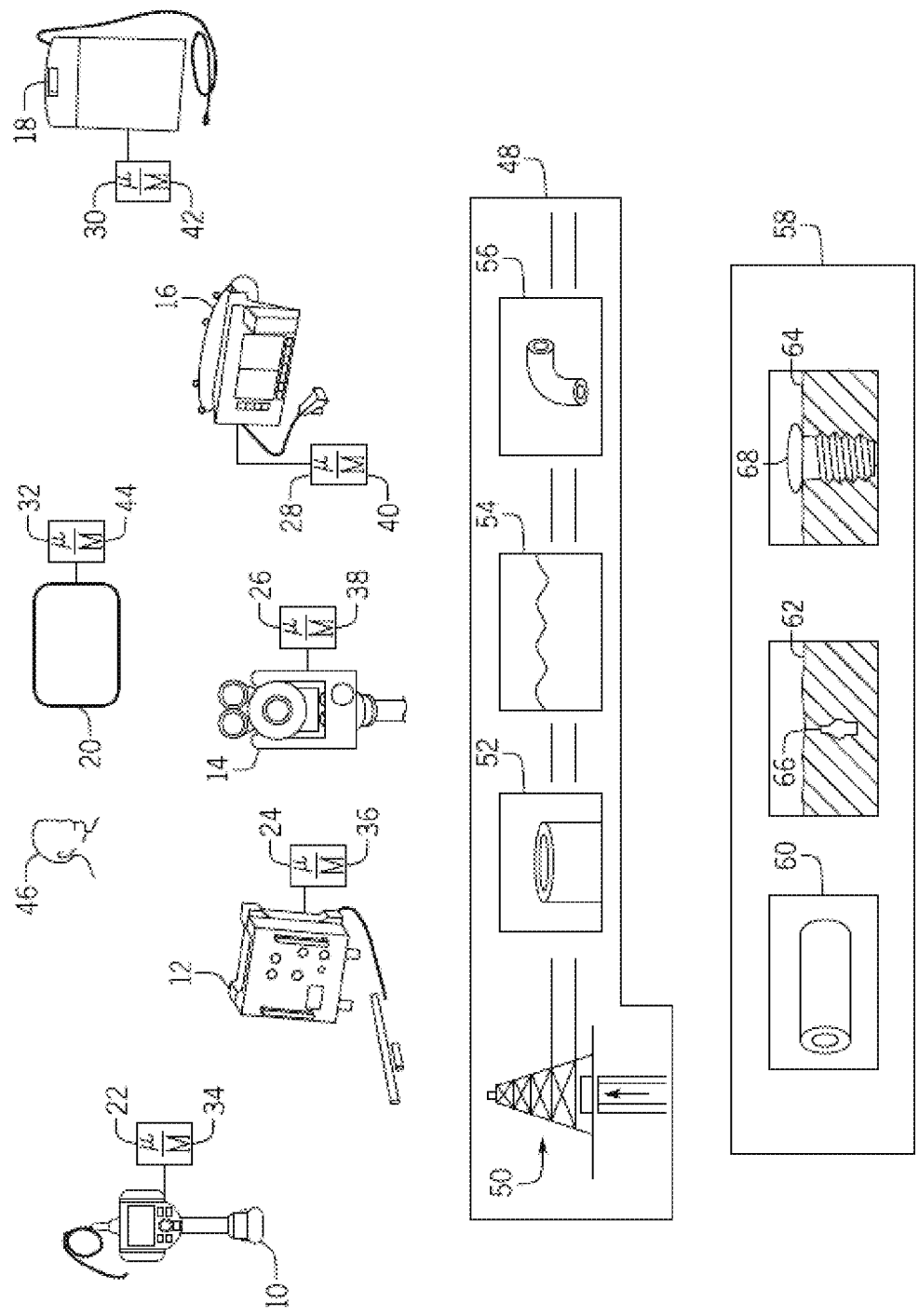
FIG. 1 illustrates a plurality of non-destructive testing (NDT) devices and systems, in accordance with an embodiment of the present approach.

By way of introduction, FIG. 1 depicts a block diagram of embodiments of a variety of portable NDT systems that may include the techniques described herein. In the depicted embodiment, the portable NDT systems may include a video borescope 10, an eddy current inspection device 12, a transportable pan-tilt-zoom (PTZ) camera 14, an ultrasonic flaw detector 16, a portable digital radiography device 18, and an interface device 20. The interface device 20 may be a mobile device (e.g., cell phone, laptop, tablet, etc.) communicatively coupled to the aforementioned NDT systems 10, 12, 14, 16, and 18 suitable for providing enhanced visualization (e.g., at a larger screen display), and for remote control and operations of the NDT systems 10, 12, 14, 16, and 18. The NDT systems 10, 12, 14, 16, 18, and 20 may be connected to each other and to local servers (e.g., local area network [LAN] servers), remote servers (e.g., wide area network [WAN] servers), and "cloud" based devices and services. In one embodiment, the interface device 20 may be a MENTOR™ hardware device or software "app" executable via a mobile device (e.g., cell phone, phone, tablet, etc.) available from General Electric Company, of Schenectady, N.Y. Likewise, the devices 10, 12, 14, 16, and 18 may also be available from General Electric Company, of Schenectady, N.Y. In some embodiments, the devices 10, 12, 14, 16, and 18 can also be available from Waygate Technologies, a Baker Hughes Company of Houston, Tex.

The depicted NDT devices 10, 12, 14, 16, 18, and 20 include respective processors 22, 24, 26, 28, 30, and 32 and memory 34, 36, 38, 40, 42, and 44. The NDT devices 10, 12, 14, 16, 18, and 20 may additionally include a communications system suitable for communicating with other NDT devices 10, 12, 14, 16, 18, and 20 and with external systems such as "cloud" based systems, servers, computing devices (e.g., tablets, workstations, laptops, notebooks, etc.) and the like. The memory 34, 36, 38, 40, 42, and 44 may include tangible non-transitory storage suitable for storing computer code or instructions implementing the various techniques described herein and executable via the respective processors 24, 26, 28, 30, 32, and 34. The devices 10, 12, 14, 16, 18, and 20 may also include respective displays useful in visualizing the techniques described herein. In operation, an operator 46 may utilize the NDT system 10, 12, 14, 16, 18, and 20 to inspect facilities 48, including facilities that may have oil and gas equipment 50, and may include locations such as the interior of pipes or conduits 52, underwater (or underfluid) locations 54, and difficult to observe locations such as pipes or conduits having curves or bends 56. Other systems 58 may also be inspected, such as aircraft systems, power generation systems (e.g., gas turbines, steam turbines, wind turbines, hydroturbines, combustion engines, generators, electric motors, etc.), machinery (e.g., compressors, expanders, valves, actuators, etc.) and the like, that may include conduits 60, various surfaces 62 and 64, and may be used to find undesired cracks 66 or to visualize parts 68, among many other uses. Accordingly, it may be possible to enhance the visual observation of various equipment, such as an aircraft system 58 and facilities 48, with x-ray observation modalities, ultrasonic observation modalities, and eddy current observation modalities. For example, the interior and the walls of pipes 52, 56, and 60 may be inspected for corrosion and erosion. Likewise, obstructions or undesired growth inside of the pipes 52, 56, and 60 may be detected by using the devices 10, 12, 14, 16, 18, and 20. Similarly, fissures or cracks disposed inside of certain ferrous or non-ferrous material 62 and 64 may be observed. Additionally, the disposition and viability of parts 68 inserted inside of components may be verified. Indeed, using the techniques described herein may improve inspection of the facilities 48 and systems 58.

The NDT devices 10, 12, 14, 16, and 18 utilize a menu-driven inspection (MDI) GUI to enable the operator 46 to inspect facilities 48 and systems 58. MDI, as described herein, is a technique for NDT inspection that utilizes graphical "menus" with certain visual components (e.g., icons, textual components, numeric components, and so on) to aid the operator 46 in navigating the device (e.g., NDT devices 10, 12, 14, 16, 18 and 20) to different location within and around the facilities 48 and systems 58 to acquire images and videos. The MDI program on the NDT devices 10, 12, 14, 16, 18, and 20 utilize a GUI 70, as shown in FIGS. 2-8 and described further below. However, the embodiments and features of the embodiments described below may also be applied to other types of inspection programs used with NDT devices.

Figure 2:
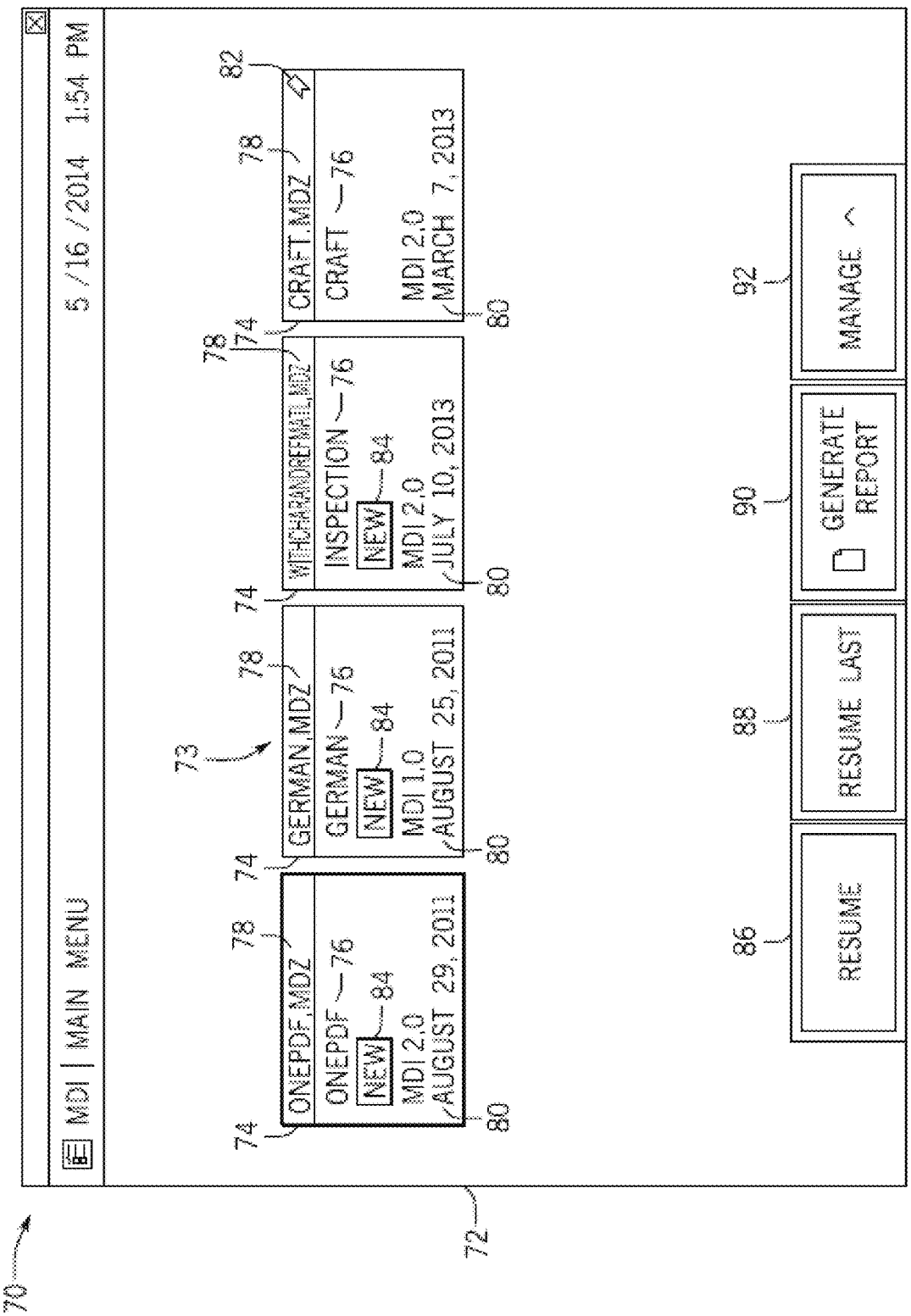
FIG. 2 is a screenshot of a home screen included in a graphical user interface (GUI) of an NDT device of FIG. 1, in accordance with an embodiment of the present approach.

Turning now to FIG. 2, the GUI 70 includes a home screen 72. The home screen 72 may be the first screen the NDT device (e.g., the video borescope 10) presents upon start-up. Alternatively, the home screen 72 may be presented after other screens. The home screen 72 includes a list 73 of all of the ongoing inspections assigned to the operator 46. Each ongoing inspection is represented by a tile 74. It should be noted that, in other embodiments of the interface structure 70, other types of design schemes may be used to depict ongoing inspections. In the depicted embodiment, the list 73 includes four tiles 74.

Each tile 74 may include a label or title 76 used to identify the inspection, the name 78 of a folder containing the data related to the inspection, and a date 80 corresponding to the last date on which the inspection was performed, as shown in FIG. 2. In some embodiments, a particular tile 74 may also include a flag icon 82 suitable for "bookmarking" or otherwise indicating that the corresponding inspection is the last performed inspection. Further, in some embodiments, the tiles 74 may include a "new" label 84 that signifies that the corresponding inspection was downloaded to the NDT device during the last period in which the NDT device connected to an external system used for creating, assigning, and overseeing inspections. Alternately or additionally, the "new" label 84 may signify that the operator 46 has yet to begin the corresponding inspection. That is, the "new" label 84 may signify that the tile 74 corresponds to a template for the corresponding inspection, and that the operator 46 has yet to begin or complete the corresponding inspection.

The home screen 72 may also include several buttons (e.g., virtual buttons) representing actions that the operator 46 may take with regards to the inspections, as depicted in FIG. 2. For instance, the operator 46 may select any of the tiles 74 and then activate a "resume" button 86 to resume the corresponding inspection. Activating the "resume" button 86 may bring the operator 46 to the last saved spot in the inspection or to the beginning of the inspection. In another example, the operator 46 may activate a "resume last" button 88, which will resume the last performed inspection. This selection may bring the operator 46 to the last saved spot in the inspection or to the beginning of the inspections, similarly to the "resume" button 86.

The operator 46 may also select any of the tiles 74 and then activate a "generate report" button 90 that creates a shell document for a report that includes the images associated with the corresponding inspection. The "generate report" button 90 and its associated features are described in more detail below. Further, the operator may select any of the tiles 74 and activate a "manage" menu 92 to access options related to managing the corresponding inspection.

When the operator 46 selects a new inspection, such as the "Craft" inspection depicted in FIG. 2, he or she is then presented with an inspection details screen 94, which is shown in FIG. 3. The inspection details screen 94 may be used to collect and capture information related to the overall inspection. Some of the information may be inputted by the operator 46 into a text box 96, such as the serial number 98 of the equipment to be inspected. Additional information, such as the location of the asset being inspected, the identification of the inspector, additional asset characteristics, or the like can also be captured. Additionally, some of the information, such as the current date 100 and time 102, may be automatically captured and entered into a text box 96.

Figure 4:
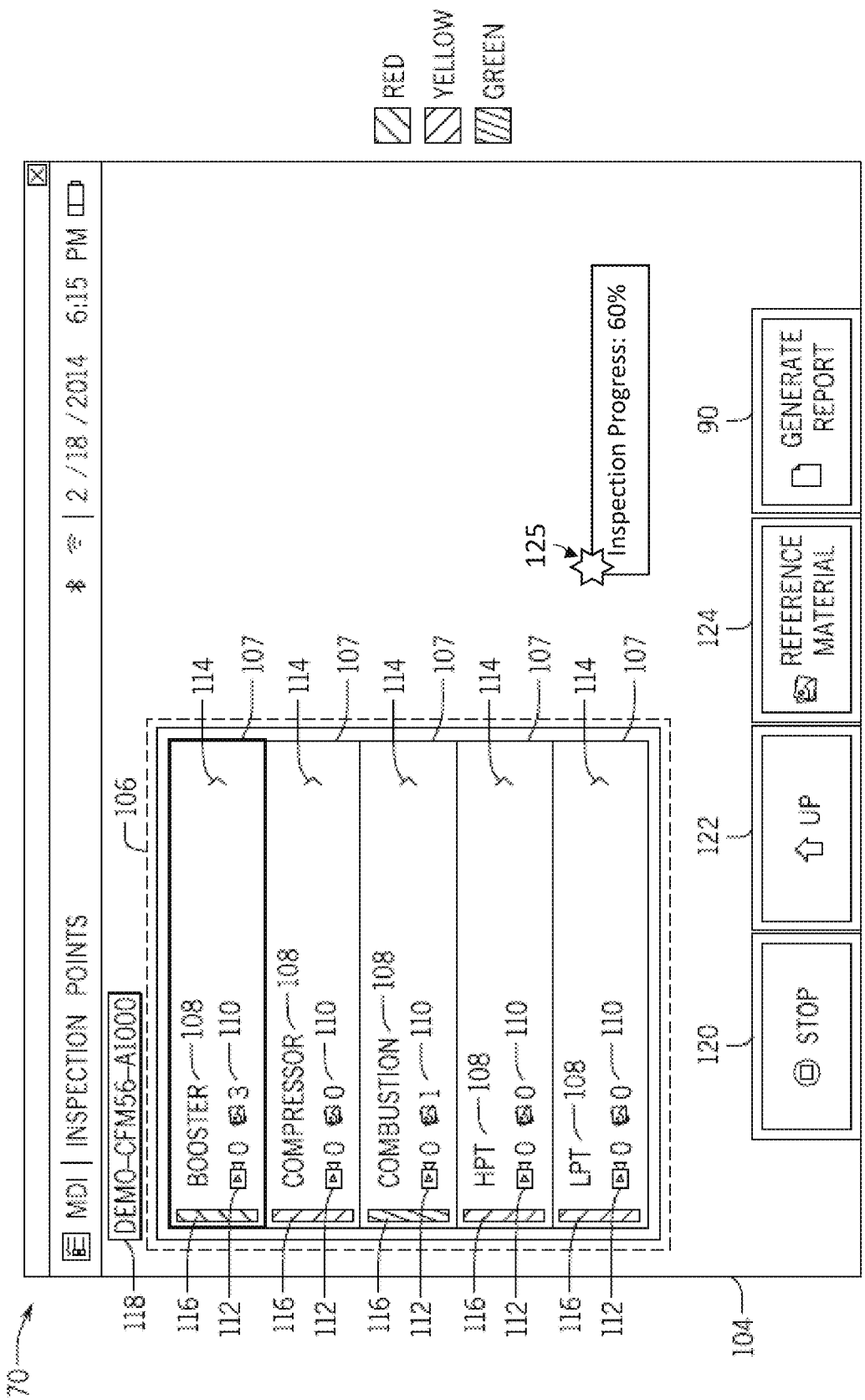
FIG. 4 is a screenshot of an inspection point screen included in the GUI of the NDT device of FIG. 1, in accordance with an embodiment of the present approach.
Figure 5:
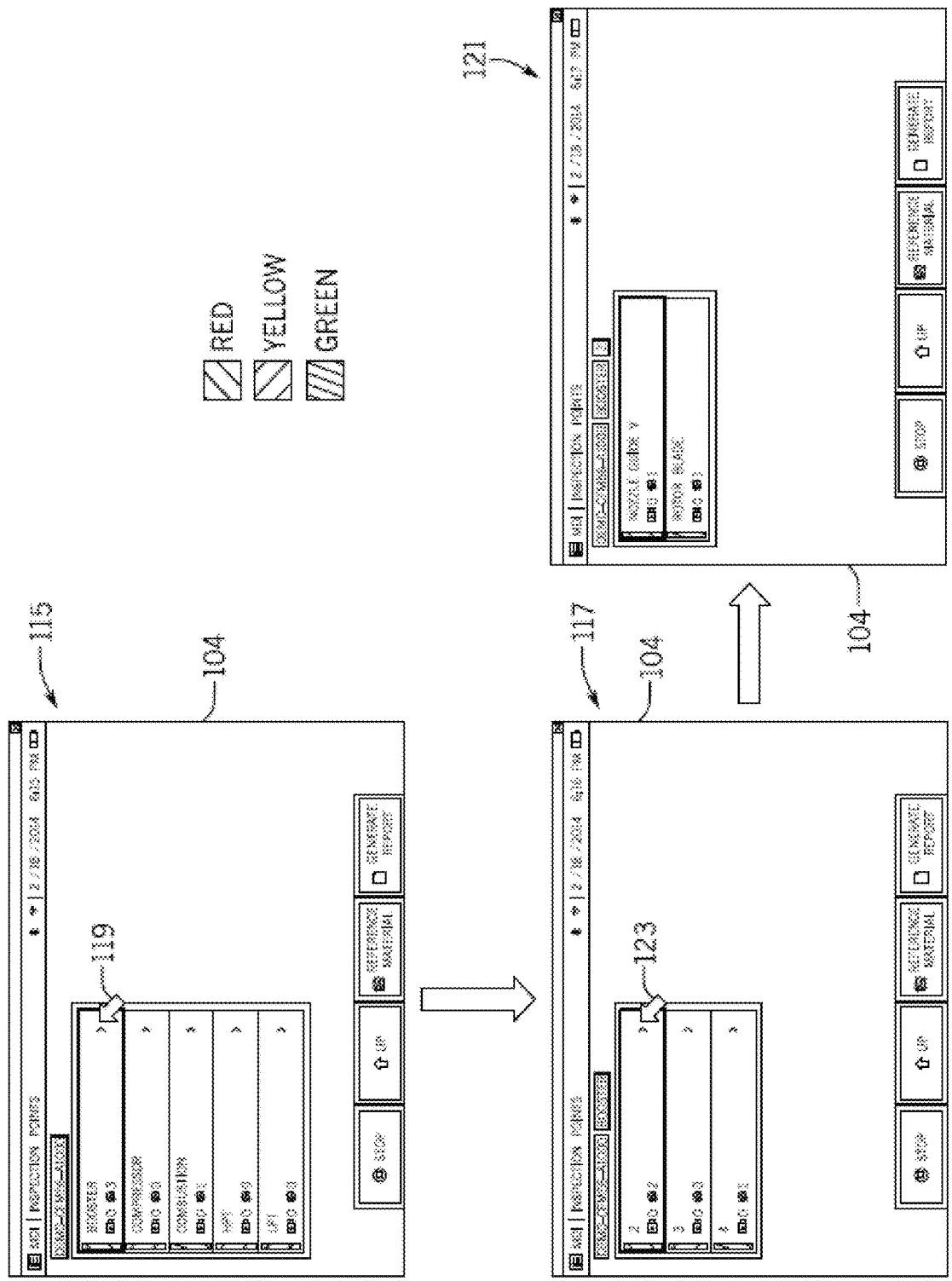
FIG. 5 illustrates various screens embodiments displayed by navigating through an inspection point tree, in accordance with an embodiment of the present approach.
Figure 6:
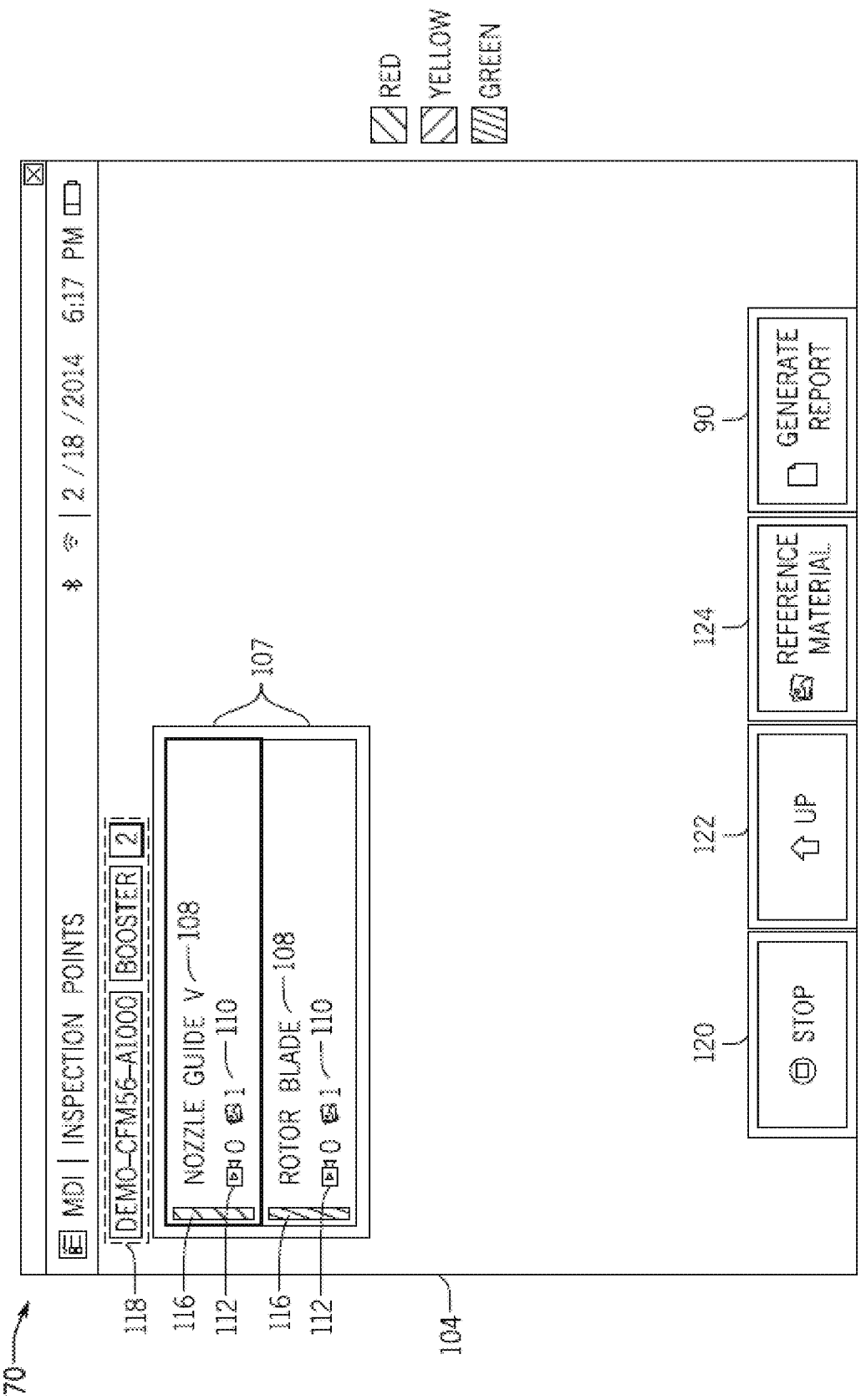
FIG. 6 is a screenshot of an inspection point screen included in the GUI of the NDT device of FIG. 1, in accordance with another embodiment of the present approach.

Once the information has been entered into the inspection details screen 94, the operator 46 may then begin the inspection. In one embodiment, the inspection may be modeled by using an inspection point tree data structure, which, as shown in FIGS. 4-6, may then be displayed as a hierarchical view of the inspection points. Specifically, each inspection point and area may be represented as a node of the inspection point tree. As depicted in FIGS. 4-6, each node may have children. For example, a node corresponding to an inspection area may have several children that corresponding to inspection points located within the inspection area.

Turning now to FIG. 4, the operator 46 first views an inspection point screen 104 associated with a root of the inspection point tree 106. Although the inspection point screen 104 is described below in relation to the root of the inspection point tree 106, it should be noted that the inspection point screen 104 may be navigated and used to display any node of the inspection point tree 106.

The inspection point screen 104 may include child nodes 107 of the current node (e.g., the root in the depicted embodiment). For instance, the inspection point screen 104 in FIG. 4 includes five child nodes 107 corresponding to the five children of the root of the inspection point tree 106. Each child node 107 includes a name 108 of the node and the associated inspection point or area, a counter 110 that represents the number of images currently captured for the child node 107, and a counter 112 that represents the number of videos currently captured for the child node 107. If a particular child node 107 has any children, then the child node 107 may include a right-arrow icon 114 that, when selected, will cause the screen 104 to redisplay all children nodes of the selected node 107 (e.g., grandchildren nodes of the root of the tree 106), thus enabling navigation through the tree 106 in a depth-first manner. Other tree navigation techniques, including breadth-first, go-to-node, and so on, may also be used. Each child node 107 also includes a color strip icon 116 that indicates whether any of the images and videos associated with the child node 107 is flagged; the color strip icon 116 is discussed in further detail below.

The inspection point screen 104 may also include an interactive label or marker 118 that shows the current path traversed through the inspection point tree 106. For example, since FIG. 4 depicts the root of the inspection point tree 106, the interactive marker 118 only includes the title of the inspection. As the operator 46 navigates through the inspection point tree 106, the interactive marker 118 expands or collapses to show the current path. Further, each node displayed in the interactive marker 118, when selected, will navigate to an inspection point screen 104 for that particular node, such that the operator can navigate through the inspection point tree using the interactive marker 118.

The inspection point screen 104 may further include a "stop" button 120 that, when activated, saves and exits the inspection. For example, the last node navigated through may be saved at a current inspection state. Additionally, the inspection point screen 104 may include an "up" button 122 that, when selected, will navigate to an inspection point screen 104 for the parent node of the current node. As will be appreciated, the "up" button 122 may be an alternative to using the interactive marker 118 to navigate through the inspection point tree. The inspection point screen 104 may also include a "reference material" button 124, that when selected, will prompt a display of reference materials associated with the current node. The "reference material" button 124 is described in further detail below. The inspection point screen 104 may also include a "generate report" button 90. The inspection point screen 104 can further include an inspection progress notification 125. The inspection progress notification 125 can provide the NDT operator performing the inspection with an indication of the inspection progress. In some embodiments, the inspection progress indicator 125 can be provided for display on the inspection point screen 104 in response to comparing the rate of inspection progress of the current inspection to a predetermined rate of inspection progress.

It is to be noted that, in some embodiments, the background of the inspection point screen 104 may be the current view of the sensor (e.g., camera), as shown in FIG. 4. Indeed, the graphical menus of FIG. 4 may be superimposed onto images or video and used during the inspection process. Using the right-angle icons 114, the interactive marker 118, and the "up" buttons 122, the operator 46 may navigate to all nodes of the inspection point tree 106. For example, the operator 46 may navigate through a particular level of the inspection point tree 106, as shown in FIG. 5. For example, FIG. 5 depicts a first screen state 115, then a second screen state 117 arrived at via user selection 119, and then a third screen state 121 arrived at via user selection 123, to arrive at the inspection point screen 104 depicted in FIG. 6.

As described above, the inspection point screen 104 of FIG. 6 includes child nodes 107, the interactive marker 118, the "stop" button 120, the "up" button 122, the "reference material" button 124, and the "generate report" button 90. Further, neither of the two child nodes 107 have children, as evidenced by the lack of right-angle icons 114 in FIG. 6. At this point, the operator 46 can acquire images or videos for each of the inspection points represented by the child nodes 107 (i.e., Nozzle Guide V and Rotor Blade). In particular, the operator 46 selects one of the child nodes 107 and then begins to acquire images and videos. The MDI program associates the acquired images and videos with the selected child node 107 as the images and videos are captured, thereby improving over a manual association process (e.g., non MDI process) performed after completion of the inspection. Further, as the operator 46 acquires images and videos, the counters 110 and 112 update on the display operatively coupled to the NDT device. As will be appreciated, the counters 110 and 112 for the parent node, grandparent nodes, and the like also update, albeit off-screen.

If the operator 46 suspects or observes a defect (e.g., a crack 66) based on an image or video, he or she can flag the image or video. As mentioned above, the color strip icon 116 updates as necessary to indicate if an image or video associated with an inspection point node is flagged. For example, in FIG. 6, the child node 106 titled "Nozzle Guide V" has a red color strip icon 116, which signifies that at least one image or video associated with the inspection point node is flagged. However, the child node "106" titled "Rotor Blade" has a green color strip icon 116, which signifies that none of the associated images and videos is flagged. In some embodiments, the functionality of the color strip icon 116 may be combined with the functionality of the counters 110 and 112. For instance, a yellow color strip icon 116 may signify that no images or videos have been acquired for the selected inspection point node and its children. It should be noted that, similarly to the counters 110 and 112, flagging images and videos affects the color strip icon 116 not only for the selected child node 106 but for the parent node, grandparent nodes, and the like.

In addition to flagging images and videos, the operator 46 may also add comments. Some common comments, such as "conduit needs to be flushed" may be pre-saved options that the operator 46 can select to add to an image or video. Further, in certain embodiments, the operator 46 may also record voice annotations during the inspection of a particular child node 107.

As mentioned above, the inspection point screen 104 depicted in FIG. 6 includes the "reference material" button 124. When selected, the "reference material" button 124 prompts a display of reference material, which can include reference manuals relevant to the selected inspection point node. The reference manuals can illustrate a range of states for the corresponding inspection point (e.g., "excellent condition," "acceptable," "needs maintenance," etc.) that the operator 46 may compare to acquired images and videos to evaluate the inspection point. The reference material can also include an illustration of the orientation of the image that is desired to be captured in the inspection. In some embodiments, the reference manuals may be shown side-by-side with the MDI program such that the operator 46 may view the MDI program and the reference manuals without navigating between the two objects. In other embodiments, the reference material can include a semi-transparent image which may be provided as an overlay atop a live inspection image to assist in obtaining the desired orientation of the object being inspected.

The inspection point screen 104 of FIG. 6 also includes the "generate report" button 90, as stated above. When activated, the "generate report" button 90 generates a shell document for a report that includes the information collected via the inspection details screen 94 and all of the images and any accompanying data (e.g., if an image is flagged or has any comments). In some embodiments, the shell document also includes a link (e.g., hyperlink) to a repository that includes the videos and any accompanying data. Alternately or additionally, the shell document may include the actual videos and any accompanying data. Similarly, the shell document may include the recorded voice annotations or a link to a repository containing the recorded voice annotations.

Figure 7:
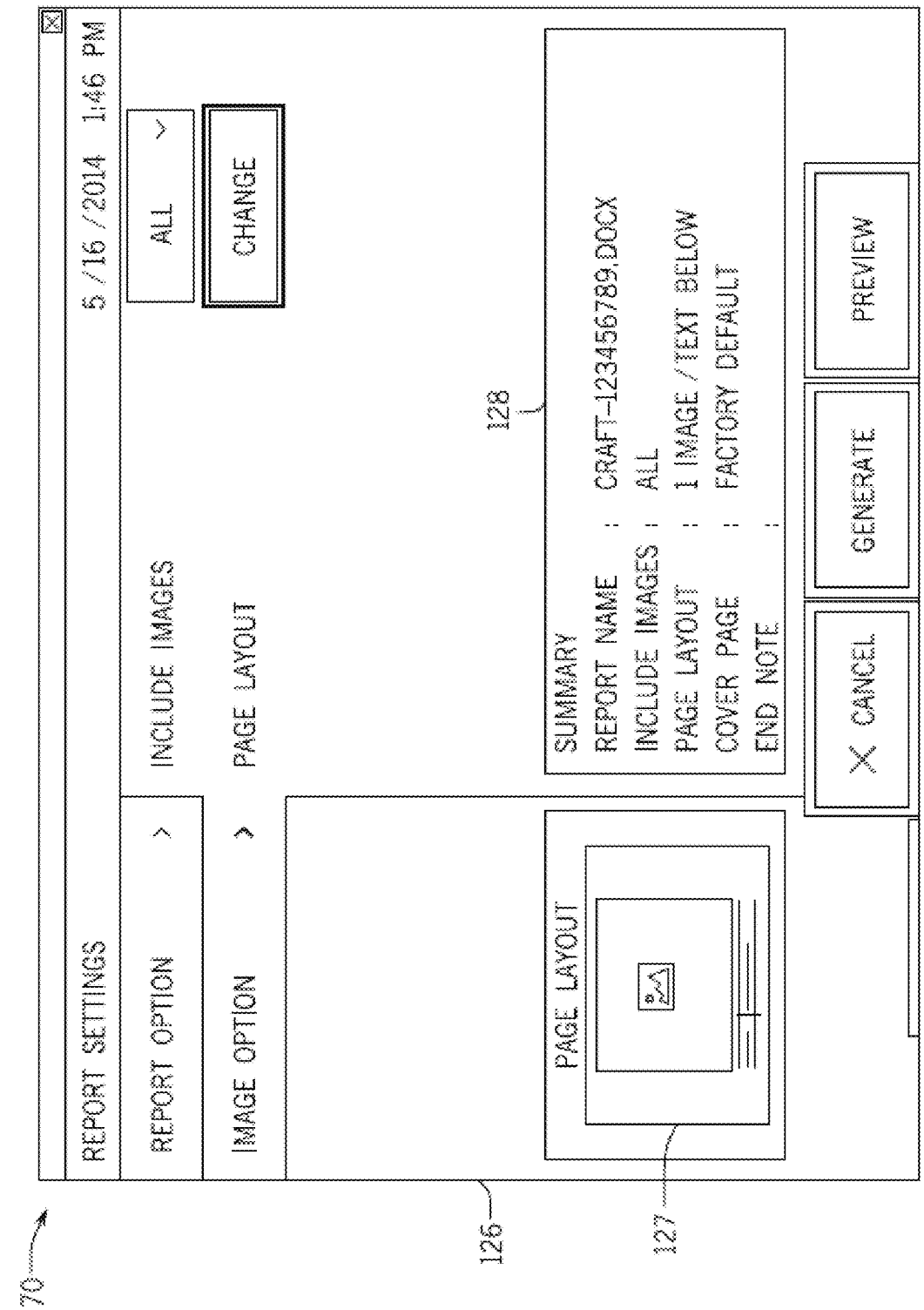
FIG. 7 is a screenshot of a report settings screen included in the GUI of the NDT device of FIG. 1, in accordance with an embodiment of the present approach.
Figure 8:
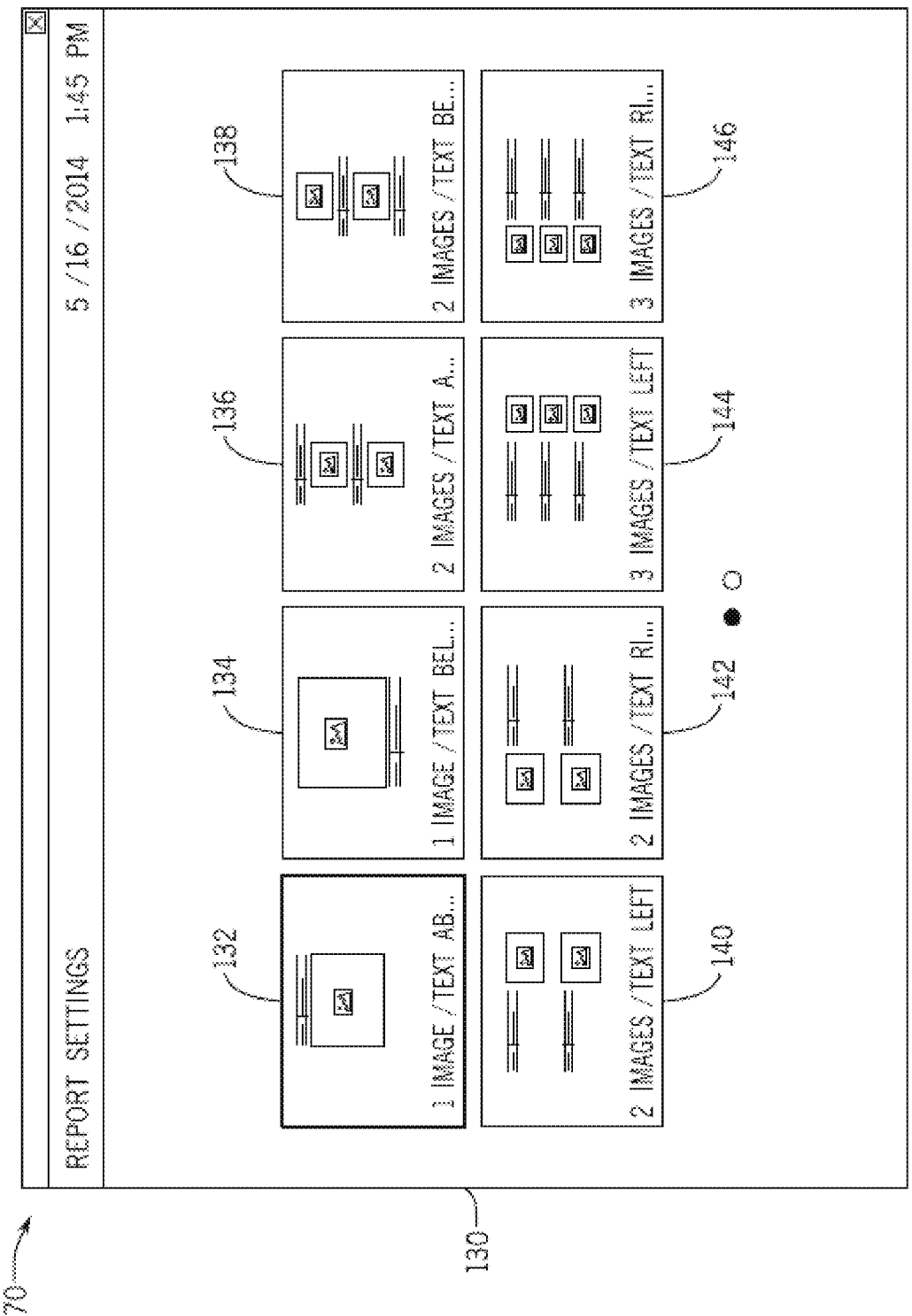
FIG. 8 is a screenshot of a page layout screen included in the GUI of the NDT device of FIG. 1, in accordance with an embodiment of the present approach.

The operator 46 may have some control over the format of the shell document. For instance, selecting the "generate report" button 90 may prompt a report settings screen 126 similar to the one in FIG. 7. The report settings screen 126 may include a summary 128 of the images included in the shell document, the name of the shell document, a layout 127 of the shell document, the type of cover page, and the type of end page. The report settings screen 126 may also include an option for the operator 46 to preview the shell document. If the operator 46 desires, he or she may change any of the information in the summary 128, such as the layout of the shell document. For example, activating the change button as shown in FIG. 7 may prompt a page layout screen 130, as depicted in FIG. 8, which lists a variety of formatting or layout embodiments for the shell document. For example, a single image with text on the top layout 132, a single image with text on the bottom layout 134, a double image with text on top layout 136, a double image with text on the bottom layout 138, double image with text on a left side layout 140, a double image with text on a right layout 142, a multiple images with text on a left layout 144, a multiple image with text on the right layout 146, and so on. Indeed, a variety of layouts may be provided, suitable for a number of images with associated text on the top, bottom, left, right, or a combination thereof. Alternately or additionally, some of the information in the summary 128 may be immutable.

Referring back to FIG. 7, once the operator 46 is satisfied with the preview of the shell document, he or she may generate the shell document, which is then saved to the same location as the other files associated with the inspection. In some embodiments, the operator 46 may send the generated report, the inspection file, images, videos, and other associated data to a repository, the inspection system mentioned above, and other components, devices, and systems.

Figure 9:
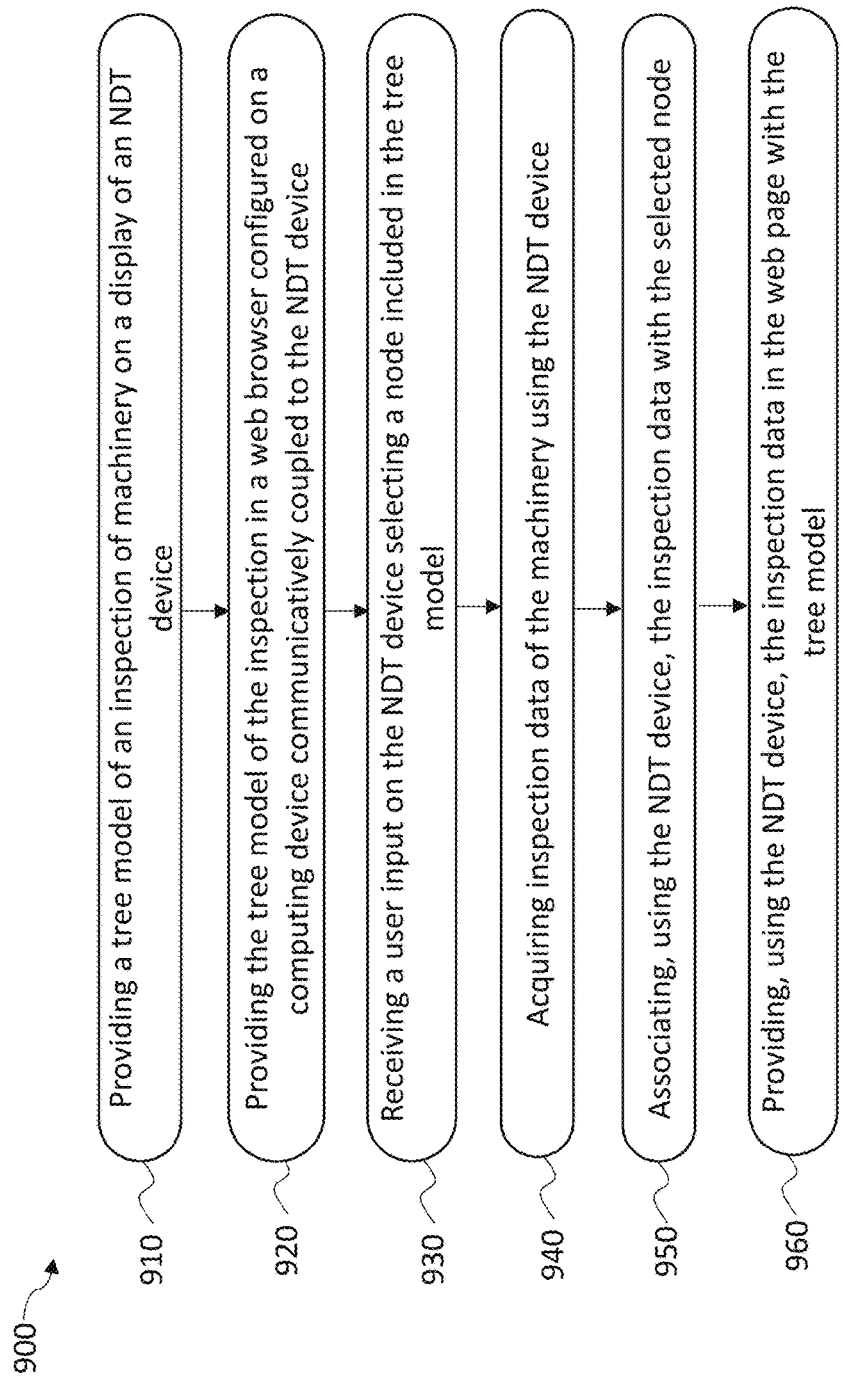
FIG. 9 illustrates an example process of performing non-destructive testing, in accordance with an embodiment of the present approach.

FIG. 9 illustrates an example process 900 of performing non-destructive testing, in accordance with embodiments described herein. The process 900 can enable NDT devices, shown and described in relation to FIG. 1, to transmit and receive NDT inspection data and inspection progress data, between themselves. In this way, inspection data can be provided to experts and/or inspector supervisors to assess inspection progress, NDT inspection device usage, and inspection quality. The use interfaces described herein improve the operation of the NDT devices 10, 12, 14, 16, 18 and the interface device 20 by continuously providing inspection progress data and monitoring in real-time or substantially in real-time via web-based applications and interfaces. In one embodiment, the inspection data and inspection progress data can be provided to remote computing devices coupled to the NDT device used in an inspection via cloud computing environments. Inspection data and inspection progress data can be continuously provided to an interface device in a live, dynamic manner as an inspection progresses. NDT inspection progress and NDT inspection management can be enhanced using the systems and methods described in relation to FIG. 9.

As shown in FIG. 9, at 910, a tree model of an inspection of machinery is provided on a display of an NDT device. The NDT device, such as NDT devices 10, 12, 14, 16, 18, can display the tree model associated with an NDT inspection to be performed on the machinery at one or more inspection locations. The inspection locations can correspond to each node of the tree model 106 as described in relation to FIG. 4. The machinery to be inspected can include a power generation system, an oil and gas production system, an aircraft, an automobile, a ship, an industrial manufacturing facility, and a chemical processing facility. Each node in the tree model 106 can correspond to an inspection location which can be associated with a component of the machinery to be inspected or can be associated with different machinery to be inspected.

At 920, the tree model 106 can be provided in a web browser configured on a computing device 20 communicatively coupled to one or more of the NDT devices 10, 12, 14, 16, 18. The web browser can provide a web page displaying the tree model to a user located remotely from the location at which the NDT inspection is occurring. The web browser can be configured to dynamically update the web page displaying the tree model so that inspection data and inspection progress data is automatically provided via the web page as the inspection is performed. In some embodiments, the web page can include a graphical icons configured to connect the web page to the NDT device 10, 12, 14, 16, 18. In some embodiments, the web page can be configured to dynamically update the inspection data and inspection progress data on a pre-determined, user-configurable time schedule, such as every minute, hour, 6-hours, 12-hours, 24-hours or the like.

At 930, a user input can be received on the NDT device selecting a node in the tree model 106. A user can select a node, such as node 107 of tree model 106 shown and described in FIG. 4. The user can select the node 107 as the user performing the inspection is positioned at the inspection location corresponding to node 107. At 940, the user can acquire inspection data of the machinery using the NDT device. In some embodiments, the inspection data can include an image, a flagged image, a video, a flagged video, or a combination thereof associated with the machinery located at the location corresponding to node 107. Additionally, in some embodiments, additional details associated with the asset being inspected can be acquired automatically from an external device that can be communicatively coupled to the NDT device. For example, the blade number in a given stage being inspected can be acquired from the external device used to rotate the engine during an inspection. At 950, the user can associate the inspection data with the selected node using the NDT device.

At 960, the inspection data can be provided in the web page with the tree model. The inspection data and inspection progress data can be transmitted from the NDT device 10, 12, 14, 16, 18 to the interface device 20 and can be provided in the web page displayed in the web browser provided on the interface device 20. The inspection data and/or the inspection progress data can be displayed in the web page as inspection locations (or nodes) are visited and/or as inspection data is acquired at the location. In some embodiments, the inspection and/or inspection progress data can be provided in the web page based on approval of the inspection data by an operator of the interface device 20.

Figure 10:
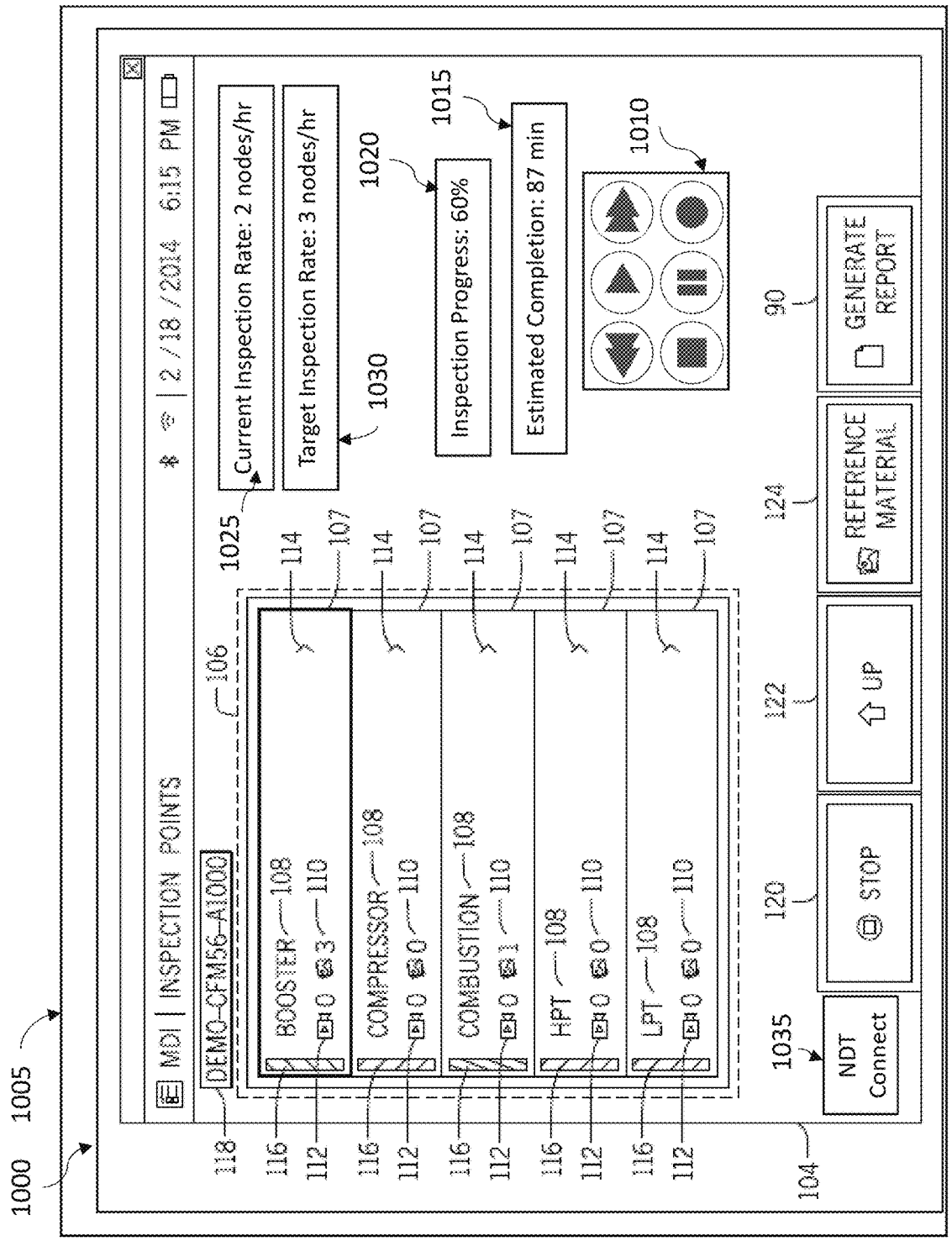
FIG. 10 illustrates an example web page configured for providing inspection data acquired during an NDT inspection, in accordance with an embodiment of the present approach.

FIG. 10 illustrates a diagram of an example web page 1000 displayed within a web browser 1005 configured on interface device 20 of FIG. 1. As shown in FIG. 10, the web page 1000 can include the tree model 106 including nodes 107. The web page 1000 also includes inspection progress controls 1010 which can be configured to rewind, play, fast-forward, stop, pause, and record the inspection being performed. The web page 1000 can also provide an estimated completion time 1015 for the inspection to complete the inspection based on the inspectors inspection progress 1020. The current rate of inspection 1025 can be determined and displayed in the web page 1000. In some embodiments, the current rate of inspection can be compared to a target rate of inspection or an objective rate of inspection 1030. The target rate of inspection 1030 can be compared to the current rate of inspection 1025 to determine whether or not an inspection progress notification is to be provided for display on the NDT device 10, 12, 14, 16, 18 to inform the user performing the inspection of the status of the inspection progress with regard to the desired or target rate of inspection 1030. In some embodiments, the web page 1000 can also include an icon 1035 for connecting the web page 1000 directly to the NDT device 10, 12, 14, 16, 18 so as to view data immediately as it is acquired at the NDT device.

Figure 11:
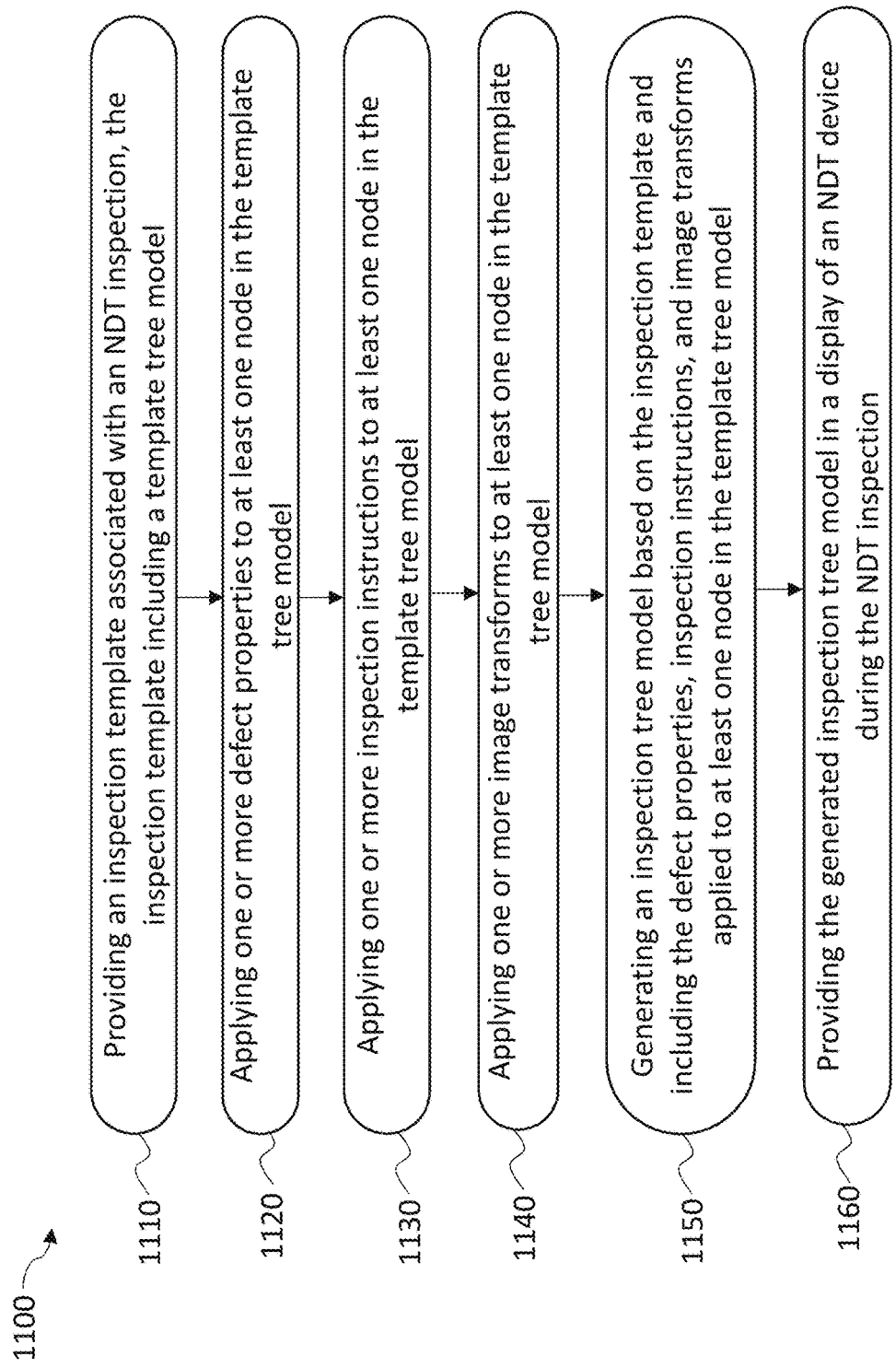
FIG. 11 illustrates an example process of creating a tree model of a NDT inspection, in accordance with an embodiment of the present approach.

FIG. 11 illustrates an example process 1100 of creating a tree model 106 of an NDT inspection, in accordance with an embodiment of the present approach. The tree model 106 can be configured from an inspection template tree model in which a user can configure nodes 107 associated with inspection locations of machinery. The inspection tree model can further allow the user to associate properties with each node 107 such as defect properties, inspection instructions, and image transforms to be applied to the inspection data collected at each inspection location. In this way, an NDT inspection can be customized to provide the NDT device operator with a robust data regarding an appropriate defect, inspection method, and/or inspection image processing.

At 1110, an inspection template associated with an NDT inspection can be provided on a computing device, such as interface device 20. The inspection template can include a tree-like structure, such as a template tree model. The template tree model can include multiple nodes 107 which can each be associated with a different inspection point of the NDT inspection.

At 1120, a user can apply one or more defect properties to a node in the template tree model. The defect properties can include defects which may be identified during the inspection of the machinery. The user can apply one or more defect properties to the node 107 by selecting the defect properties from a list of defect properties characterizing defects or expected defects of the machinery. In some embodiments, the defect properties can include a crack, a burn, a dent, a missing material, a blemish, a scratch, and/or a quality control defect. The defect properties applied to the node 107 can then be attributed to the acquired inspection data to characterize a defect of the machinery at the inspection point location.

At 1130, a user can apply one or more inspection instructions to a node in the template tree model. The inspection instructions can include tasks to be performed during the inspection at the inspection point location associated with the node 107. The user can apply one or more inspection instructions to the node 107 by selecting the inspection instructions from a list of inspection instructions associated with inspecting the machinery. For example, in some embodiments, the inspection instructions can include a measurement task, a device configuration task, a display configuration task, a reference assessment task, an inspection approval task, and an inspection criteria task.

A measurement task inspection instruction can include an instruction informing the user of the NDT device performing the inspection to acquire a measurement of the machinery, such as a dimension, an image, and/or a scan of the machinery. In some embodiments, the measurement task can include instructions for the NDT device user to acquire a measurement of the machinery by reconfiguring the NDT device 10, 12, 14, 16, 18. A device configuration task can include instructions to guide the NDT device user to configure or reconfigure the NDT device so as to properly acquire inspection data. For example, if an NDT device was previously configured to acquire image inspection data in a "stereo view", the inspection instructions at a particular node 107 can include a device configuration task to inform the user to apply a "single view" at the time of acquiring image inspection data at the inspection point location associated with that particular node 107. In another example, a device configuration task can include instructions to change or apply a tip or attachment to the NDT device 10, 12, 14, 16, 18 to enable acquisition of higher quality or specific inspection data.

In some embodiments, the inspection instructions can include a display configuration task. A display configuration task can provide instructions to the NDT device user to configure or adjust a display of the acquired inspection data within the NDT device 10, 12, 14, 16, 18 as well as for display to any remote computing device coupled to the NDT device, such as interface device 20. The display configuration task can provide instructions such that the inspection data can be displayed properly on the interface device 20 when viewed by an expert or highly-skilled inspection resource who may be located remotely from the location of the inspection. In some embodiments, the inspection instructions can include a reference assessment task. The reference assessment task can inform the user of the NDT device 10, 12, 14, 16, 18 to access or view reference data associated with the inspection point location. For example, the reference assessment task can include instructions which cause the NDT device 10, 12, 14, 16, 18 to automatically display a reference image for the NDT device user to compare to the acquired inspection data. In this way, the NDT device user can receive reinforcement of the importance of acquiring inspection data of a particular format or quality level which can be provided via the reference assessment task.

In some embodiments, the inspection instructions can include an inspection approval task. The inspection approval task can include instructions indicating whether or not acquired inspection data must be provided to a supervisor or expert resource prior to proceeding further with the inspection. In some embodiments, the inspection instructions can include an inspection criteria task. The inspection criteria task can include criteria that must be met to complete the inspection at the inspection point location. For example, the inspection criteria task can include criteria to be performed by the NDT device user. In some embodiments, the inspection criteria tasks can include criteria about the quality, quantity, or format of the acquired inspection data.

At 1140, a user can apply one or more image transforms to a node in the template tree model. The image transforms can include image processing modifications or tasks to be performed during the inspection at the inspection point location associated with the node 107. The user can apply one or more image transforms to the node 107 by selecting the image transform from a list of image transforms associated with inspecting the machinery. For example, in some embodiments, the image transforms can include a brightness level modification, an invert modification, an inverse+ modification, a contrast modification, a darkness boost modification, and a zoom modification. An invert modification can be configured to adjust the display of image data, such as flipping or inverting the inspection image horizontally so as to display a mirror image of the inspection image. The inverse+ modification can be configured to invert dark and light portions of the inspection data, such that darker areas can be inverted to be shown as lighter areas, and lighter areas can be inverted to be shown as darker areas.

At 1150, an inspection tree model can be generated based on the inspection template. The generated inspection tree model can include the defect properties, inspection instructions, and image transforms as applied to any of the nodes included in the template tree model. In some embodiments, the inspection tree model can include computer-readable, executable instructions configured to cause the NDT device 10, 12, 14, 16, 18 to automatically configure itself for inspection based on the NDT device user selecting a node in the inspection tree which includes an inspection instruction and/or an image transform which was applied in the template tree model. In this way, the NDT device 10, 12, 14, 16, 18 can be operated to perform inspections more efficiently and without requiring a user to explicitly configure the NDT device 10, 12, 14, 16, 18 manually. For example, upon selecting a node in the inspection tree model to which a zoom modification has been applied to the corresponding node in the tree model, the NDT device 10, 12, 14, 16, 18 can automatically configure a zoom or magnification setting on the NDT device prior to acquiring the inspection data.

At 1160, the generated inspection tree model can be provided in a display of the NDT device 10, 12, 14, 16, 18 during the NDT inspection. In some embodiments, the generated inspection tree model can be provide prior to or after conducting an inspection. In some embodiments, the generated inspection tree model can be simultaneously provided in a display of an interface device 20 that can be communicatively coupled to the NDT device 10, 12, 14, 16, 18.

Figure 12:
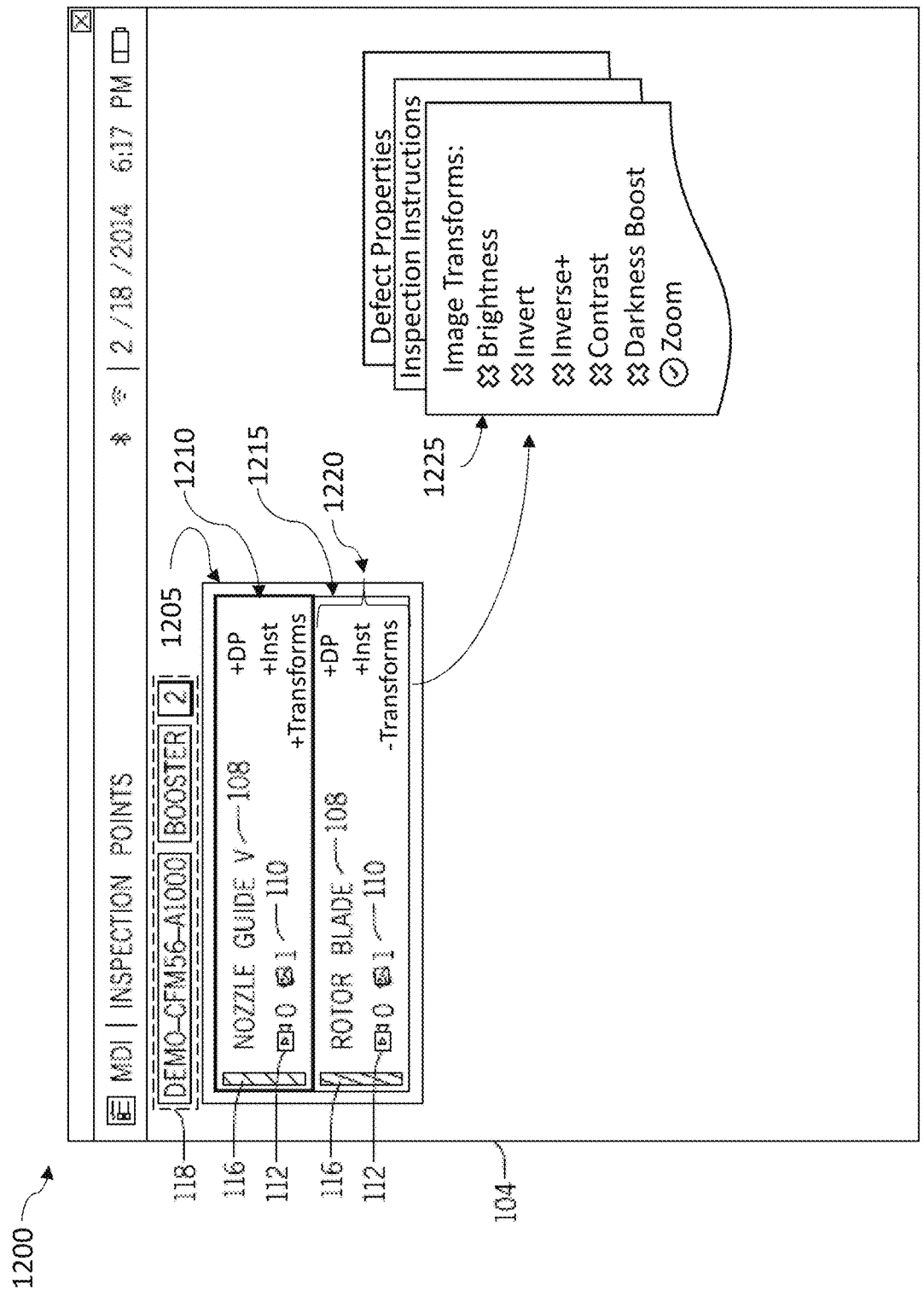
FIG. 12 illustrates a diagram of an example inspection template including a template tree model, in accordance with an embodiment of the present approach.

FIG. 12 illustrates a diagram of an example inspection template 1200 displayed on a computing device, such as interface device 20 of FIG. 1, which may be coupled to NDT device 10, 12, 14, 16, 18. As shown in FIG. 12, an inspection template 1200 can be provided and can include a template tree model 1205. The template tree model can include one or more nodes 1210 indicating inspection point locations at which inspection data is to be acquired during the NDT inspection. The node 1210 can be configured to provide a list of defect properties, e.g., "DP"; inspection instructions, e.g., "Inst"; and image transforms, e.g., "Transforms", as shown by reference 1220 in node 1215.

A user configuring a node within the template tree model 1205, can interact with a graphical icon or similar graphical representation, such as a pulldown, a toggle, a checkbox, or a multicomponent selector which can be associated with the defect properties, inspection instructions, and image transforms to be applied to nodes 1210 and 1215. For example, as shown in FIG. 12, a user has toggled or selected to identify one or more image transforms to be applied to node 1215. The user can expand a list of image transforms 1225 and can input a selection of an image transform to be applied to node 1220. As shown in FIG. 12, the user has provided an input via a "check" to select a "Zoom" image transform to be applied to node 1220. The inspection tree model generated based on the template tree model shown within the inspection template of FIG. 12, will include a "Zoom" image transform to be applied to the acquired inspection data of the rotor blade at the inspection location associated with node 1215.

Technical effects of the present embodiments include systems for performing remote visual inspection of industrial equipment and for configuring an inspection tree model for an NDT inspection. Certain embodiments may increase the efficiency and efficacy of inspections. For example, the present embodiments include an GUI for an MDI process that guides users through inspection areas and points based on an inspection tree model and transmits inspection data in real-time to a web browser on a remote computing device. For example, a remote operator or supervisor may view the inspection progress and provide feedback regarding the inspection. By dynamically updating inspection data within the web browser, a remote operator can be immediately apprised of inspection data without being collocated at the inspection point location. Further technical effects of the present embodiments include systems for creating an inspection tree model of a NDT inspection. A GUI may be configured to provide an inspection template including a template tree model to which a user can apply one or more of a defect property, an inspection instruction, and/or an image transform. The GUI can generate an inspection tree model based on the template tree model. The inspection tree model can include nodes which identify and include the applied defect properties, inspection instructions, and image transforms. In this way, the GUI provides an efficient means of generating an NDT inspection with customized requirements to be performed at each inspection point location. As a result, inspections can be performed more accurately and can generate higher quality inspection data during initial inspections and reduce the need for re-inspection and post-processing of inspection data to correct errors in the acquired inspection data. It should be noted that the embodiments described in the specification may have other technical effects and can solve other technical problems.

Certain exemplary embodiments have been described to provide an overall understanding of the principles of the structure, function, manufacture, and use of the systems, devices, and methods disclosed herein. One or more examples of these embodiments have been illustrated in the accompanying drawings. Those skilled in the art will understand that the systems, devices, and methods specifically described herein and illustrated in the accompanying drawings are non-limiting exemplary embodiments and that the scope of the present invention is defined solely by the claims. The features illustrated or described in connection with one exemplary embodiment may be combined with the features of other embodiments. Such modifications and variations are intended to be included within the scope of the present invention. Further, in the present disclosure, like-named components of the embodiments generally have similar features, and thus within a particular embodiment each feature of each like-named component is not necessarily fully elaborated upon.

The subject matter described herein can be implemented in analog electronic circuitry, digital electronic circuitry, and/or in computer software, firmware, or hardware, including the structural means disclosed in this specification and structural equivalents thereof, or in combinations of them. The subject matter described herein can be implemented as one or more computer program products, such as one or more computer programs tangibly embodied in an information carrier (e.g., in a machine-readable storage device), or embodied in a propagated signal, for execution by, or to control the operation of, data processing apparatus (e.g., a programmable processor, a computer, or multiple computers). A computer program (also known as a program, software, software application, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file. A program can be stored in a portion of a file that holds other programs or data, in a single file dedicated to the program in question, or in multiple coordinated files (e.g., files that store one or more modules, sub-programs, or portions of code). A computer program can be deployed to be executed on one computer or on multiple computers at one site or distributed across multiple sites and interconnected by a communication network.

The processes and logic flows described in this specification, including the method steps of the subject matter described herein, can be performed by one or more programmable processors executing one or more computer programs to perform functions of the subject matter described herein by operating on input data and generating output. The processes and logic flows can also be performed by, and apparatus of the subject matter described herein can be implemented as, special purpose logic circuitry, e.g., a GPU (graphical processing unit), an FPGA (field programmable gate array) or an ASIC (application-specific integrated circuit).

Processors suitable for the execution of a computer program include, by way of example, both general and special purpose microprocessors, and any one or more processor of any kind of digital computer. Generally, a processor will receive instructions and data from a read-only memory or a random access memory or both. The essential elements of a computer are a processor for executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, (e.g., EPROM, EEPROM, and flash memory devices); magnetic disks, (e.g., internal hard disks or removable disks); magneto-optical disks; and optical disks (e.g., CD and DVD disks). The processor and the memory can be supplemented by, or incorporated in, special purpose logic circuitry.

To provide for interaction with a user, the subject matter described herein can be implemented on a computer having a display device, e.g., a CRT (cathode ray tube) or LCD (liquid crystal display) monitor, for displaying information to the user and a keyboard and a pointing device, (e.g., a mouse or a trackball), by which the user can provide input to the computer. Other kinds of devices can be used to provide for interaction with a user as well. For example, feedback provided to the user can be any form of sensory feedback, (e.g., visual feedback, auditory feedback, or tactile feedback), and input from the user can be received in any form, including acoustic, speech, or tactile input.

The techniques described herein can be implemented using one or more modules. As used herein, the term "module" refers to computing software, firmware, hardware, and/or various combinations thereof. At a minimum, however, modules are not to be interpreted as software that is not implemented on hardware, firmware, or recorded on a non-transitory processor readable recordable storage medium (i.e., modules are not software per se). Indeed "module" is to be interpreted to always include at least some physical, non-transitory hardware such as a part of a processor or computer. Two different modules can share the same physical hardware (e.g., two different modules can use the same processor and network interface). The modules described herein can be combined, integrated, separated, and/or duplicated to support various applications. Also, a function described herein as being performed at a particular module can be performed at one or more other modules and/or by one or more other devices instead of or in addition to the function performed at the particular module. Further, the modules can be implemented across multiple devices and/or other components local or remote to one another. Additionally, the modules can be moved from one device and added to another device, and/or can be included in both devices.

The subject matter described herein can be implemented in a computing system that includes a back-end component (e.g., a data server), a middleware component (e.g., an application server), or a front-end component (e.g., a client computer having a graphical user interface or a web browser through which a user can interact with an implementation of the subject matter described herein), or any combination of such back-end, middleware, and front-end components. The components of the system can be interconnected by any form or medium of digital data communication, e.g., a communication network. Examples of communication networks include a local area network ("LAN") and a wide area network ("WAN"), e.g., the Internet.

Approximating language, as used herein throughout the specification and claims, may be applied to modify any quantitative representation that could permissibly vary without resulting in a change in the basic function to which it is related. Accordingly, a value modified by a term or terms, such as "about," "approximately," and "substantially," are not to be limited to the precise value specified. In at least some instances, the approximating language may correspond to the precision of an instrument for measuring the value. Here and throughout the specification and claims, range limitations may be combined and/or interchanged, such ranges are identified and include all the sub-ranges contained therein unless context or language indicates otherwise.

One skilled in the art will appreciate further features and advantages of the invention based on the above-described embodiments. Accordingly, the present application is not to be limited by what has been particularly shown and described, except as indicated by the appended claims. All publications and references cited herein are expressly incorporated by reference in their entirety.

The invention claimed is:

1. A method of performing non-destructive testing (NDT), comprising:
    providing, by a processor of an NDT device including a camera and a display, a current view acquired by the camera in the display;
    providing, by the processor, an inspection point screen in the display overlaid atop the current view acquired by the camera, the inspection point screen including a tree model identifying a hierarchical arrangement of NDT inspection locations of machinery to be inspected using the NDT device, the tree model including a plurality of nodes ordered within the tree model with respect to the hierarchical arrangement, each node of the plurality of nodes identifying a component of the machinery located at one of the inspection locations;
    providing, by the processor, the tree model of the inspection in a web browser of a computing device communicatively coupled to the NDT device, the web browser displaying a web page including the inspection point screen, the tree model, and one or more inspection progress controls controlling recording and playback of inspection data acquired at and associated with each node in the tree model identifying the hierarchical arrangement of the inspection locations of the machinery;

receiving, by the processor, a first user input on the NDT device selecting a node included in the tree model;

acquiring, by the processor, inspection data of the component at the inspection location via the camera;

associating, by the processor, the inspection data with the selected node;

providing, by the processor, the inspection data to the computing device for display in the web page displaying the inspection point screen and the tree model, the inspection data displayed automatically in real-time as the inspection data is acquired; and receiving a second user input controlling at least one of recording or playback of the inspection data in the inspection point screen displayed in the web page using the one more inspection progress controls.

2. The method of claim 1, wherein the inspection data includes one of an image, a flagged image, a video, a flagged video, or a combination thereof.

3. The method of claim 1, wherein the machinery is included in at least one of a power generation system, an oil and gas production system, an aircraft, an automobile, a ship, an industrial manufacturing facility, or a chemical processing facility.

4. The method of claim 1, wherein the web page further includes an indication of inspection progress, and an estimated completion time for the inspection.

5. The method of claim 1 further comprising comparing, by the processor, a rate of inspection progress of a current inspection to a predetermined rate of inspection progress;

providing, by the processor, an inspection progress notification for display in the inspection point screen.

6. A non-destructive testing (NDT) device, comprising:
a camera;
a display; and
a processor operatively coupled to the camera and to the display, wherein the processor performs operations including providing a current view acquired by the camera in the display;

providing an inspection point screen in the display overlaid atop the current view acquired by the camera, the inspection point screen including a tree model identifying a hierarchical arrangement of NDT inspection locations of machinery to be inspected using the NDT device, the tree model comprising a plurality of nodes ordered with respect to the hierarchical arrangement, each node of the plurality of nodes identifying a component of the machinery located at one of the inspection locations;

providing the tree model of the inspection in a web browser of a computing device communicatively coupled to the NDT device, the web browser displaying a web page including the inspection point screen, the tree model, and one or more inspection progress controls controlling recording and playback of inspection data acquired at and associated with each node in the tree model identifying the hierarchical arrangement of the inspection locations of the machinery;

receiving a first user input from the computing device, the first user input selecting a node in the tree model;

acquiring, via the camera, inspection data of the component at the inspection location;

associating the inspection data with the selected node;

providing the inspection data to the computing device for display in the web page displaying the inspection point screen and the tree model, the inspection data displayed automatically in real-time as the inspection data is acquired; and receiving a second user input controlling at least one of recording or playback of the inspection data in the inspection point screen displayed in the web page using the one more inspection progress controls.

7. The NDT device of claim 6, wherein the inspection data includes one of an image, a flagged image, a video, a flagged video, or a combination thereof.

8. The NDT device of claim 6, wherein the machinery is included in at least one of a power generation system, an oil and gas production system, an aircraft, an automobile, a ship, an industrial manufacturing facility, or a chemical processing facility.

9. The NDT device of claim 6, wherein the web page further includes an indication of inspection progress, and an estimated completion time for the inspection.

10. The NDT device of claim 6, wherein the processor further performs operations including comparing a rate of inspection progress of a current inspection to a predetermined rate of inspection progress; and providing an inspection progress notification for display in the inspection point screen.

11. A method of creating an inspection tree model of a non-destructive testing (NDT) inspection, comprising:

using a computing device communicatively coupled to an NDT device, providing an inspection template associated with an NDT inspection of machinery, the inspection template including a template tree model identifying a hierarchical arrangement of inspection locations of machinery to be inspected using the NDT device including a display and a camera, the template tree model including a plurality of nodes ordered within the tree model with respect to the hierarchical arrangement, each node of the plurality of nodes in the template tree model identifying a component of the machinery located at one of the inspection locations;

applying one or more defect properties to at least one node in the template tree model, the one or more defect properties including potential defects of the machinery;

applying one or more inspection instructions to at least one node in the template tree model, the one or more inspection instructions instructing an inspector to perform one or more inspection tasks during the NDT inspection of the machinery;

applying one or more image transforms to at least one node in the template tree model, the one or more image transforms including image processing modifications applied to image data acquired during the NDT inspection at the inspection locations;

generating an inspection tree model based on the template tree model and including the one or more defect properties, the one or more inspection instructions, and the one or more image transforms; and providing the generated inspection tree model in an inspection point screen provided in the display of the NDT device during the NDT inspection, the inspection point screen displayed overlaid atop a current view acquired by the camera and including one or more inspection progress controls controlling recording and playback of inspection data acquired at and associated with each node in the inspection tree model.

12. The method of claim 11, wherein the one or more defect properties include a crack, a burn, a dent, a missing material, a blemish, a scratch, and a quality control defect.

13. The method of claim 11, wherein the one or more inspection instructions include a measurement task, a device configuration task, a display configuration task, a reference assessment task, an inspection approval task, and an inspection criteria task.

14. The method of claim 11, wherein the one or more image transforms include a brightness level modification, an invert modification, an inverse+ modification, a contrast modification, a darkness boost modification, and a zoom modification.

15. The method of claim 11, wherein at least one node of the generated inspection tree model includes computer-readable, executable instructions, which when executed by a user selecting the at least one node cause the NDT device to configure itself for the NDT inspection by applying the image processing modifications prior to acquiring the image data.

16. A system for creating an inspection tree model of a non-destructive testing (NDT) inspection, comprising:
an NDT device including a display and a camera; and
a computing device communicatively coupled to the NDT device, the computing device including a memory, a display and a processor operatively coupled to the display and to the memory, wherein the processor performs operations including
providing an inspection template associated with an NDT inspection of machinery, the inspection template including an template tree model identifying a hierarchical arrangement of inspection locations of machinery to be inspected using the NDT device, the template tree model including a plurality of nodes ordered within the tree model with respect to the hierarchical arrangement, each node of the plurality of nodes in the template tree model identifying a component of machinery located at one of the inspection locations;
applying one or more defect properties to at least one node in the template tree model, the one or more defect properties including potential defects of the machinery;
applying one or more inspection instructions to at least one node in the template tree model, the one or more inspection instructions instructing an inspector to perform one or more inspection tasks the NDT inspection of the machinery;
applying one or more image transforms to at least one node in the template tree model, the one or more image transforms including image processing modifications applied to image data acquired during the NDT inspection at the inspection locations;
generating an inspection tree model based on the template tree model and including the one or more defect properties, the one or more inspection instructions, and the one or more image transforms;
providing the generated inspection tree model in an inspection point screen provided in the display of the NDT device during the inspection, the inspection point screen displayed overlaid atop a current view acquired by the camera and including one or more inspection progress controls controlling recording and playback of inspection data acquired at and associated with each node in the inspection tree model.

17. The system of claim 16, wherein the one or more defect properties includes a crack, a burn, a dent, a missing material, a blemish, a scratch, and a quality control defect.

18. The system of claim 16, wherein the one or more inspection instructions include a measurement task, a device configuration task, a display configuration task, a reference assessment task, an inspection approval task, and an inspection criteria task.

19. The system of claim 16, wherein the one or more image transforms include a brightness level modification, an invert modification, an inverse+ modification, a contrast modification, a darkness boost modification, and a zoom modification.

20. The system of claim 16, wherein at least one node of the generated inspection tree model includes computer-readable, executable instructions, which when executed by a user selecting the at least one node cause the NDT device to configured itself for the NDT inspection by applying the image processing modifications prior to acquiring the image data.

* * * * *